United States Patent [19]

Burch et al.

[11] 3,998,554

[45] Dec. 21, 1976

[54] OPTICAL ALIGNMENT TECHNIQUES

[75] Inventors: James Morriss Burch, Byflest; David Charles Williams, Croydon, both of England

[73] Assignee: The Secretary of State for Industry in Her Britannic Majesty's Government of the United Kingdom of Great Britain and Northern Ireland, London, England

[22] Filed: Apr. 10, 1975

[21] Appl. No.: 566,768

[30] Foreign Application Priority Data

Apr. 11, 1974 United Kingdom ............ 16369/74

[52] U.S. Cl. .................... 356/138; 350/175 TS; 356/153; 356/172

[51] Int. Cl.[2] ......................................... G01B 11/26

[58] Field of Search ................ 356/138, 172, 153; 350/212, 175 TS

[56] References Cited

UNITED STATES PATENTS

| | | | |
|---|---|---|---|
| 1,945,977 | 2/1934 | Oswald | 350/175 TS |
| 2,256,102 | 9/1941 | Reason | 350/175 TS |
| 2,387,113 | 10/1945 | Birdick | 350/212 |
| 3,514,188 | 5/1970 | Blosse et al. | 350/212 |
| 3,552,832 | 1/1971 | Demaine | 350/212 |
| 3,694,089 | 9/1972 | Rantsch | 356/138 |

*Primary Examiner*—John K. Corbin
*Assistant Examiner*—Richard A. Rosenberger
*Attorney, Agent, or Firm*—Cameron, Kerkam, Sutton, Stowell & Stowell

[57] ABSTRACT

The invention comprises an afocal lens system having unitary magnification which is either positive or negative and suitable for indicating departures of a reference point or a reference axis respectively from coincidence with a relatively fixed datum axis. The reference point or axis is included by the axis of the lens system, and the datum axis is defined by a line through an object and the zero position of an image of that object produced by the lens system. The lens system indicates the said departures from coincidence by means of shifts of the image from the zero position. The positive magnification afocal lens system is sensitive to tilt but insensitive to displacement, whereas the reverse is true of the negative magnification version. This feature allows tilt and displacement to be monitored separately.

23 Claims, 8 Drawing Figures

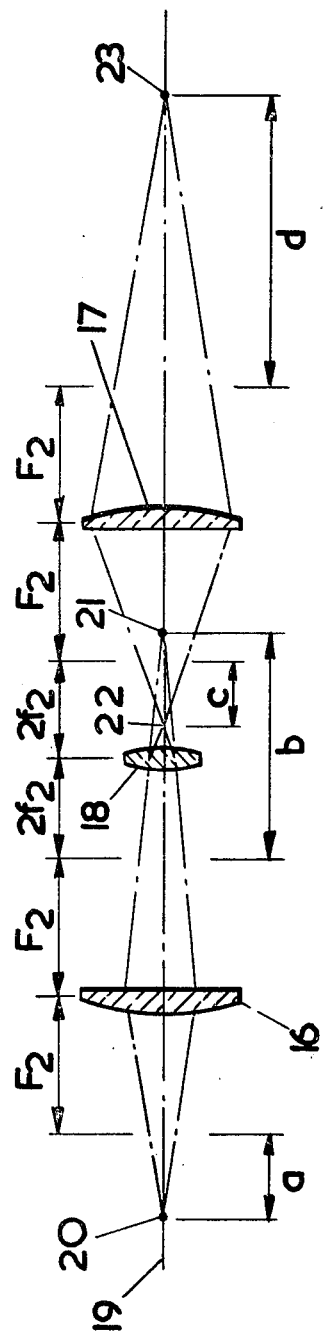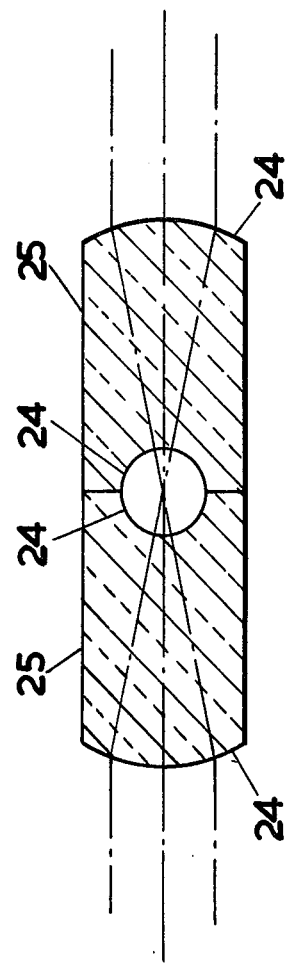

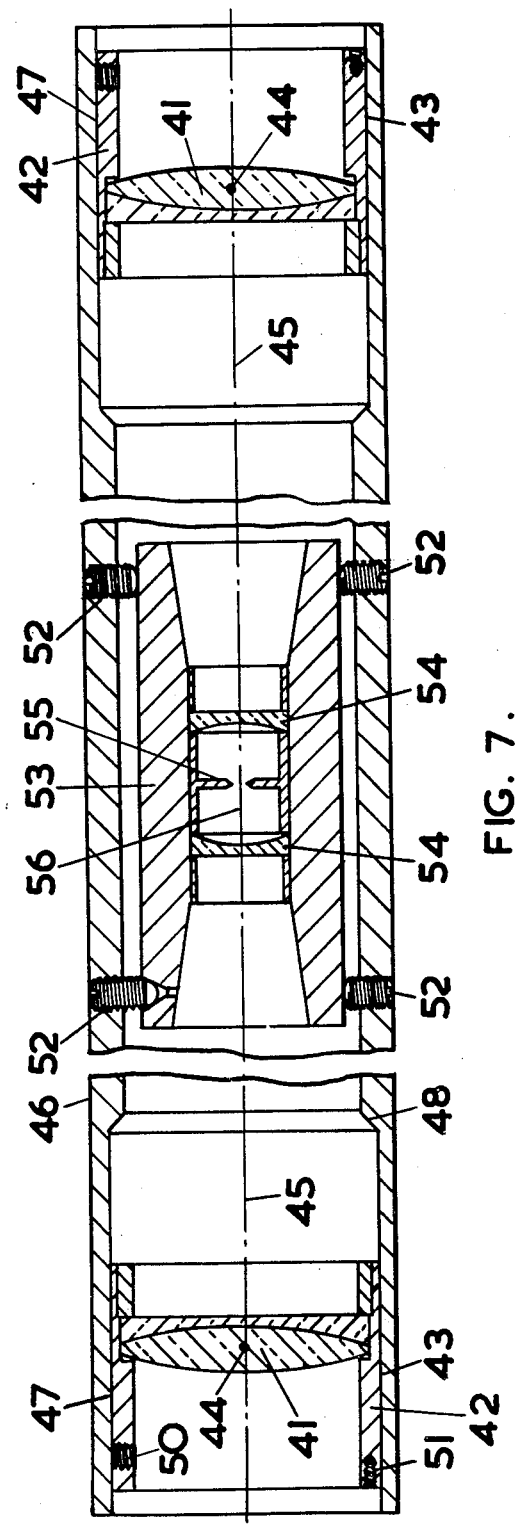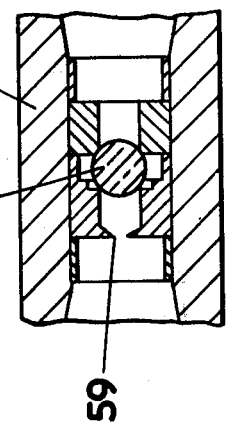
FIG. 7.
FIG. 8.

OPTICAL ALIGNMENT TECHNIQUES

The present invention relates to alignment devices and more particularly to devices for indicating alignment discrepancies of a point or an axis with respect to a predetermined datum axis.

Many machines include a moving member which is required to execute a predefined linear, non-linear or rotational track, the motion of the member being required to conform to certain predetermined tolerance limits. Many machine tools possess moving work-tables on which workpieces or cutting tools are mounted, and other machines include members required to execute a precise linear or non-linear path. Failure by the member to conform to its prescribed track might indicate an overload or faulty machine. In the machining of large metal billets, the path followed by the worktable of a large milling machine is often required to lie within close tolerances.

In the field of mensuration, it is often desirable to be able to monitor the separation of a point from a datum axis, or alternatively the separations of successive points from that axis. Furthermore, another desirable facility is the ability to indicate the inclination of two axes to one another, which axes may be skew. If the datum axis is much more than a meter in length, then simple optical systems involving, for example, one or two thin lenses and a light beam, are normally undesirably cumbersome for use in defining the axis and indicating positional or angular departures therefrom.

It is an object of the present invention to provide optical means for indicating either positional deviation of points from, or angular inclination of axes to, a particular datum axis.

According to the present invention, apparatus for indicating departures of a fiducial element of position from coincidence with a relatively fixed datum axis includes an afocal optical system comprising two outermost and at least one innermost refracting optical elements, each disposed symmetrically about a common optical axis which includes the fiducial element, the said optical system producing unitary magnification and being suitable for producing an image of an object separated from that object by a distance not less than five times the distance between the two outermost of the said refracting optical elements, and the said optical system being capable, when having an object within its field of view, of indicating departures of the said fiducial element from coincidence with the said datum axis by virtue of changes produced by those departures in the position of an image of that object produced by the optical system.

In one embodiment of the invention the optical system produces negative unitary magnification, and the fiducial element is a reference point, the optical system indicating departures of the reference point from the datum axis.

In another embodiment of the invention the optical system produces positive unitary magnification and the fiducial element is a reference axis, the optical system indicating angular departures of the reference axis from alignment with the datum axis, such angular departures corresponding to pitch or yaw of the reference axis with respect to the datum axis.

The optical system preferably includes optical elements equivalent to three or more optically thin lenses having a common optical axis, the outer lenses being converging in nature and the inner lenses being either converging or diverging to give optical systems of positive and negative unitary magnification suitable for indicating displacement and pitch or yaw respectively.

A positive unitary magnification optical system suitable for indicating pitch or yaw preferably comprises three converging lenses having a common optical axis, the outer lenses being optically thin and separated by the sum of their focal lengths plus four times the focal length of the inner lens, and the inner lens being either optically thick or thin and being situated from either lens by a distance equal to twice its own focal length plus the focal length of the respective outer lens. In one preferred arrangement, the inner lens is a glass sphere.

A positive unitary magnification lens system alternatively comprises two optically thick lenses substantially in the form of cylinders with convex spherically ground bases, the cylinders almost touching one another with their axes collinear and forming the optical axis, the radii of curvature of the bases being such as to conform to the optically equivalent foregoing arrangement of three thin lenses.

A negative unitary magnification optical system suitable for indicating displacement preferably includes three lenses having a common optical axis, the two outer lenses being identical, optically thin, converging and separated by the sum of their focal lengths, and the inner lens being diverging, optically thick or thin and situated at the common focal point of the outer lenses.

A negative unitary magnification optical system alternatively includes two optically thick lenses each substantially in the form of a cylinder with spherically ground bases, each cylinder having one concave and one convex base, the axes of the cylinders being collinear and forming the optical axis, the concave bases of the cylinders being in contact and the radii of curvature of the bases conforming to the foregoing optically equivalent three lenses.

In order that the invention may be more fully understood, five embodiments thereof will not be described, by way of example only, with reference to FIGS. 1 to 4 accompanying the provisional specification together with the accompanying FIGS. 5 to 8 in which:

FIG. 3 shows a thin lens system of three converging lenses.

FIG. 4 shows a two element thick lens system optically equivalent to the arrangement of FIG. 2.

FIG. 7 shows a fully engineered version of the arrangement shown in FIG. 6, and

FIG. 8 shows an alternative central lens and lens holder for the arrangement of FIG. 7 to produce an equivalent of the system shown in FIG. 3.

Figure 1:
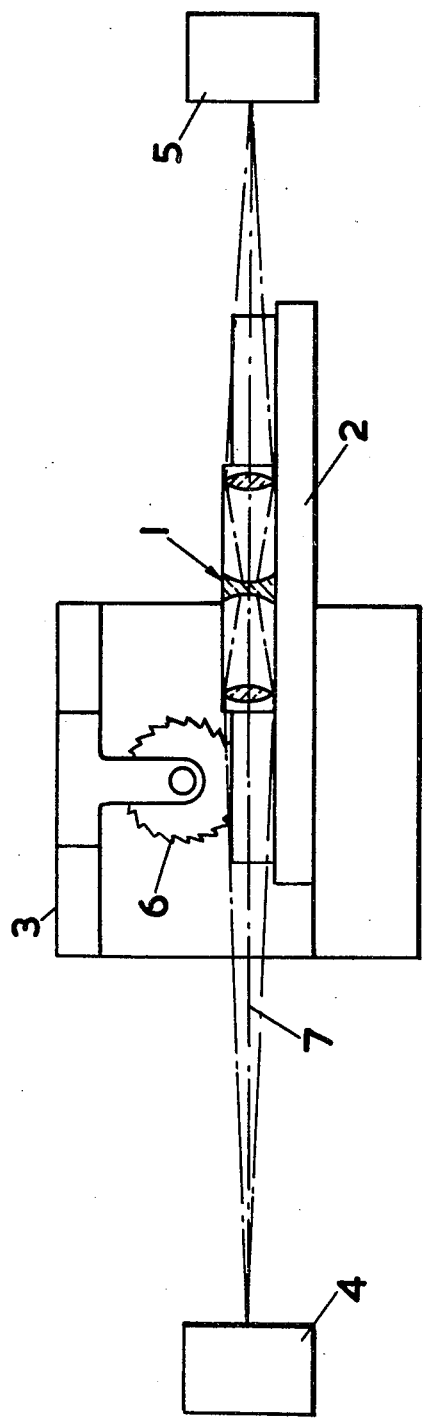
FIG. 1 shows schematically a milling machine worktable and cutting head together with a workpiece and position monitoring lens system.

FIG. 1 shows schematically an optical system 1 in accordance with the invention rigidly mounted on the worktable 2 of a milling machine 3. An object 4 and image displaying means 5 are arranged on the optical axis of the optical system 1, and approximately in line with the cutting head 6 of the milling machine 3, so that the cutting head 6 is midway between the object 4 and image displaying means 5. As the worktable 2 moves past the cutting head 6, deviations in the track of the worktable 2 with respect to the cutting head 6 are indicated by deviations in the position of an image of the object 4 on the image displaying means 5. It is understood that the milling machine 3, the cutting head 6, the object 4 and the recording means 5 remain mutually immobile. Skilled workers in the art will appreciate that a number of forms of either object 4 or image displaying means are possible within the scope of the invention. The object 4 may be, for example, an illuminated pinhole or the focus of a diverging laser beam passing through the optical system 1. The image recording means may be simply a graduated chart with an image zero position marked thereon, disturbance of the image can then be measured off the chart. Alternatively, a photoelectric device or array might be used to receive the image, and an analogue or digital readout of position is then obtainable.

In a practical embodiment of the invention, for example that shown in FIG. 1, the optical system 1 is required to be offset sufficiently to clear the cutting head 6 during travel of the worktable 2. Moreover, the image on the displaying means 5 shifts in response to departures of the optical axis of the optical system 1 (the line joining the centres of the lenses) from coincidence with the line joining the object 4 with the original position of the image. Therefore, since the worktable movement with respect to the cutting head is required to be monitored in this instance, it is necessary that the cutting point on the cutting head 6 lie on the line joining the object 4 with the original position of the image. In addition, it is necessary to define an appropriate fiducial element of position, i.e. a reference point or a reference axis which is both fixed in relation to the worktable and convenient to coincide with the optical axis of an optical system mounted on the worktable. Individual examples of optical system 1 will not be described in detail.

Figure 2:
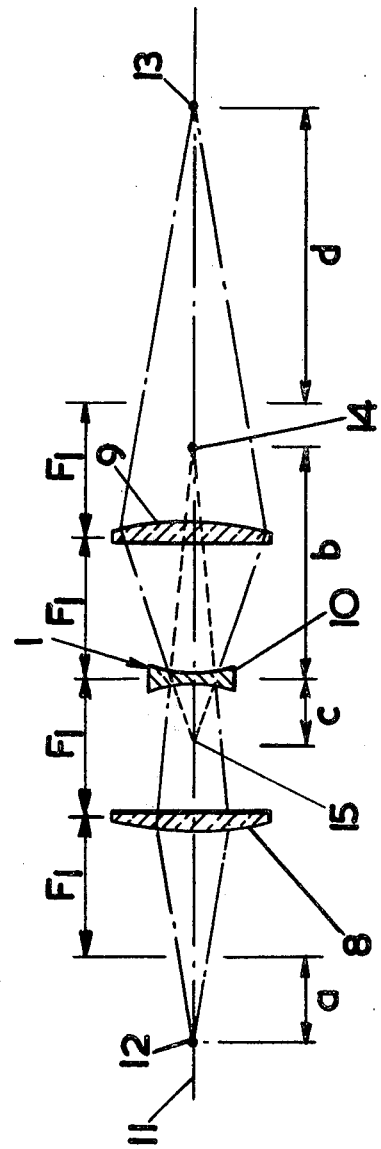
FIG. 2 shows a three element thin lens system having converging outer lenses and a diverging inner lens.

The nature of the deviations monitored by the optical system 1 depend on the type of optical system 1 employed. FIG. 2 illustrates an optical system 1 and associated light-ray diagram suitable for indicating lateral and vertical deviations. FIG. 2 shows an afocal, negative unitary magnification lens system consisting of two identical coverging lenses 8 and 9 separated by twice their focal length $F_1$, together with a diverging lens 10 having a focal length $f_1$ and positioned midway between the lenses 8 and 9. The three lenses share a common optical axis 11. Consider an object point 12 on the optical axis 11 and distant $a + 2 F_1$ from the central lens 10, and a corresponding image point 13 distant $d + 2 F_1$ from the lens 10. If the virtual image of the object point 12 produced by the lens 8 is at a point 14 distant $b$ from the lens 10, and the virtual object of the lens 9 is at a point 15 distant C from the lens 10, then applying the Newtonian form of the lens equation to the outer lenses 8 and 9 it is seen that $$ab = cd = F_1^2 \tag{1}$$

and the ordinary lens equation applied to the central lens 10 yields $$\frac{1}{b} + \frac{1}{c} = \frac{1}{f_1} \tag{2}$$

Hence $$a + d = -\frac{F_1^2}{f_1} \tag{3}$$

So that $$S = 4 F_1 - \frac{F_1^2}{f_1} \tag{4}$$

where S is the separation between the object and image points 12 and 13 respectively. Equation (4) demonstrates that S is constant for all pairs of values $a$ and $d$, and hence the lens system may be moved along the line joining any object with its image without affecting the size or sharpness of focus of the image.

If the object point 12 is situated off the optical axis 11 by a distance h, but remaining within the field of view of the lens system, then the corresponding image point 13 is also shifted off the optical axis 4 by a distance $h$, but the direction of shift, although parallel, is in the opposite direction to that of the object point 12. Conversely, if the lens system is mounted independently of the object producing and image recording means, then a transverse displacement of the lens system gives an image shift of twice that displacement. Furthermore, since the line joining an off-axis object point to its image intersects the axis halfway between the object and image, the image will be unaffected by tilts of the lens system if the centre of rotation lies midway between object and image. If the optical system of FIG. 2 is installed as shown in FIG. 1, then lateral or vertical shifts of the optical system 1 will produce twice that shift in the image position, indicating that the worktable 2 has shifted relative to the cutting head 6. If the image position is displayed on a screen, then the screen must be monitored to reset the machine 3. If photoelectric image recording means are employed, then this might either be linked to an alarm or be part of a servo loop which readjusts the positions of the cutting head and workpiece with respect to one another. Since the position of the image produced by the lens system of FIG. 2 is independent of pitch or yaw about the object-image midpoint, and because the cutting head 6 is mid-way between the object and image, the image position is independent of pitch or yaw of the worktable about the cutting head and this can be monitored separately.

FIG. 3 illustrates a lens system and associated light-ray diagram suitable for monitoring pitch or yaw of a worktable 2 in FIG. 1, and comprising three converging lenses. Two identical converging lenses 16 and 17 having focal lengths $F_2$ are positioned symmetrically either side of a third converging lens 18 of focal length $f_2$. The three lenses 16, 17 and 18 have a common optical axis 19. Consider an object point 20 situated on the axis 19 distant $a + F_2$ from the lens 16. The lens 16 produces a virtual image 21 of the object point 20, the virtual image 21 being distant $b + F_2$ from the lens 16. The lens 18 produces a real image 22 of the virtual image 21 distant $c + F_2$ from the lens 17. The lens 17 produces a real image 23 of the image 22 at a distance $d + F_2$ from the lens 17.

The Newtonian lens equation then gives $$ab = cd = F_2^2 \tag{5}$$

and for the central lens 18 the ordinary lens equation gives $$\frac{1}{2f_2 - c} - \frac{1}{b - 2f_2} = \frac{1}{f_2} \qquad (6)$$

(6) gives $$\frac{1}{b} + \frac{1}{c} = \frac{1}{f_2} \qquad (7)$$

(5) and (7) yield the separation S of the object and image points 20 and 23

$$S = 4(F_2 + f_2) + \frac{F_2^2}{f_2} \qquad (8)$$

The image point 23 is unaffected by transverse displacements of the lens system within its field of view, but any pitch or yaw of the lens system shifts the image by an amount equal to the product of the angle of rotation and the object point 20 — image point 23 separation S. The tilt sensitivity is the same for any axial position of the system.

Four degrees of machine worktable freedom, lateral and vertical displacement, pitch and yaw can be monitored separately by mounting displacement systems and tilt assemblies, as shown in FIGS. 3 and 4 respectively, side by side on a moving worktable as shown in FIG. 1. A fifth degree of freedom, roll, may be obtained simultaneously by incorporating a polariser or half-wave plate into one of the assemblies and detecting polarisation changes in the image at the detector.

Figure 5:
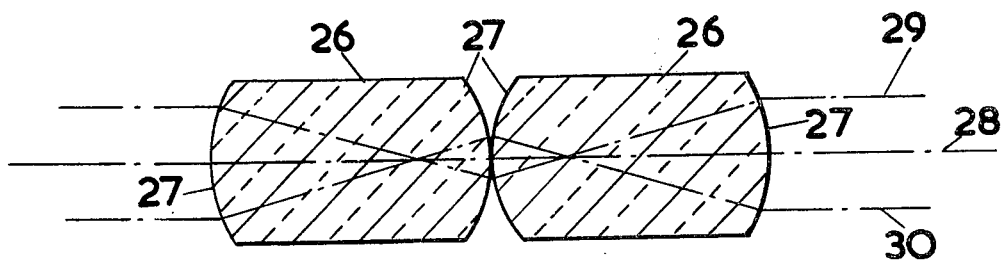
FIG. 5 shows a two element thick lens system optically equivalent to that shown in FIG. 3.

FIG. 4 shows two thick lenses optically equivalent to the arrangement shown in FIG. 2. The solid construction shown in FIG. 4 is simpler to align optically, but the lenses are not commercially available. Choice of the radii of curvature of the spherical refracting surfaces 24 of the lenses 25 is dependent on the focal lengths required, and is a simple matter of applying standard lens formulae familiar to workers in the optical field, and available in standard optical works. FIG. 5 shows a similar optical system of two thick lenses optically equivalent to the arrangement shown in FIG. 3. Two glass cylinders 26 have convex spherically ground bases 27 and are arranged coaxially with an optical axis 28. Parallel light rays 29 and 30 illustrate the light path through the system.

Figure 6:
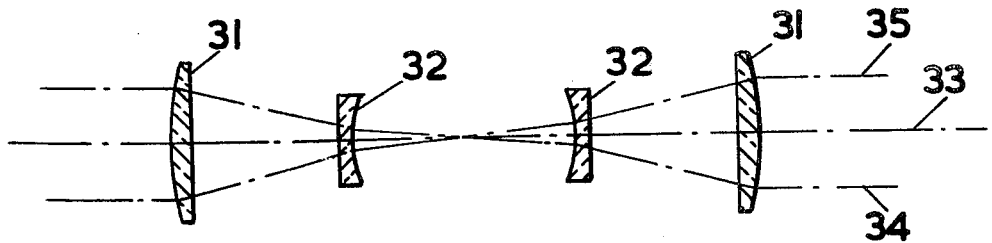
FIG. 6 shows a four element lens system.

FIG. 6 shows a four element thin lens system consisting of two telephoto lenses back to back, and optically equivalent to the arrangement of FIG. 2. Two converging lenses 31 and two diverging lenses 32 are each disposed symmetrically about an optical axis 33. Light rays 34 and 35 illustrate the light path through the system.

The lens arrangements hereinbefore described have not contained any details on provision for mounting or positionally adjusting the lenses. FIGS. 7 and 8 illustrate a practical, modular device suitable for mounting lens systems of the kind illustrated in FIGS. 2, 3 and 6. Referring to FIG. 7, achromatic doublet lenses 41 are supported on lens mounts 42. The lenses 41 are of the binocular objective type. The lens mounts 42 are machined to have accurate cylindrical surfaces 43 and the optical centre 44 of each lens 41 lies on each axis 45 of the respective cylindrical surface 43. The lens mounts 42 are accurate sliding fits within a mild steel tube 46 partially machined along the outer regions 47 of its inner surface. The outer machined regions 47 maintain the axis 45 and the surfaces 43 coincident and therefore the optical centres 44 of the lenses 41 lie on the same axis. The lens mounts 42 are adjusted axially inside the surface 47, and the bevelled shoulders 48 of the tube 46 provide sufficient axial clearance to ensure that the lens 41 can be focused correctly. The lens mounts are clamped in position by means of screws 50. The lens mounts 42 are also provided with screws 51 to which lens mount withdrawal members (not shown) may be attached. Positioning screws 52 locate a lens holder 53 within the tube 46. The lens holder 53 carries two fused silica diverging lenses 54 between which a stop 55 is symmetrically located. This arrangement gives negative unitary magnification.

The lenses 54 and the stop 55 are disposed symmetrically about an axis 56, and the positioning screws 52 can be employed to make the axis 56 coincide with the common axis 45 of the lens mounts 42. The optical system of FIG. 7 is that of FIG. 6 with the stop 55 added. The stop 55 defines the central point of the system which is conjugate to infinity, i.e. parallel light comes to a focus there. The stop 55 cuts down stray light and defines a constant solid angle giving constant image intensity for all object image distances. To align the system of FIG. 7, it is necessary merely to arrange that light from a point source on the axis of the lenses 41 passes through the system. When the lens system is rotated, the image of the source produced by the system will also rotate unless the axis of the lenses 54 coincides with that of the lenses 41. The lens system may be placed in V-blocks to permit ease of rotation. The positioning screws are adjusted until this condition is satisfied.

FIG. 8 shows an alternative central lens holder 57 which may replace the lens holder 53 of FIG. 7 to give positive unitary magnification similar to tht of the system of FIG. 3. The lens holder 57 carries a converging lens in the form of a glass sphere 58. A stop 59 defines one of the two points conjugate to infinity in this arrangement. Alignment procedures are those appropriate to the arrangement of FIG. 7. The glass sphere 58 is convenient to mount and gives no spherical aberration when positioned midway between source and image. The stop 59 defines a constant solid angle for light incident on the glass sphere 58, and stray reflections are reduced.

The invention hereinbefore described is intended for dynamic or static determinations of positional errors. The lens systems comprised by the invention may be mounted on moving members to determine accuracy of movement or alternatively mounted at points which require alignment checks.

A basic advantage of the invention is the smallness of the device in comparison to the object-image distance.

Clearly, more complex multi-element lens systems may be employed provided that the systems are afocal with either positive or negative unitary magnification, but the lens systems hereinbefore described are preferred since they possess features of compactness, cheapness and relative ease of alignment. A two element thin lens system might conceivably be employed, but consideration of the optics of such a system shows that, for the reasonably large object-image distances required to monitor small deviations, a two element lens system is undesirably large and cumbersome.

What is claimed is:

1. Apparatus for indicating departures of a fiducial element of position from coincidence with a relatively fixed datum axis including an afocal optical system of unitary magnification comprising the optical equivalent of at least three thin lenses, two of which lenses are outermost and spaced apart, each of the said lenses of the said optical system being disposed symmetrically about a common optical axis which is arranged to include the said fiducial element, the said optical system being operative to produce an image of an object which image and object are characterised by an objectimage distance in excess of five times the distance between the said two outermost spaced apart lenses, the said optical system being capable, when producing an image of an object, both of defining the said relatively fixed datum axis as an axis through the said object and a first image position, and of indicating departures of the said optical axis and the included fiducial element from coincidence with the said datum axis by virtue of the said departures giving rise to shifts of the said image away from the said first image position.

2. Apparatus according to claim 1 in which the optical system produces positive unitary magnification and the fiducial element is a reference axis.

3. Apparatus according to claim 2 in which the optical system comprises two converging, optically thin outermost lenses disposed symmetrically either side of an inner converging lens, each outermost lens having a focal point situated between the respective outer lens and the inner lens, and each said focal point being imaged onto the other said focal point by the inner lens.

4. Apparatus according to claims 3 in which the inner lens is substantially spherical.

5. Apparatus according to claim 2 in which the optical system includes an optical stop defining a point within the said optical system conjugate to infinity.

6. Apparatus according to claim 3 in which the optical system includes an optical stop defining a point within the said optical system conjugate to infinity.

7. Apparatus according to claim 3 in which the outer lenses of the optical system are mounted within a tube, and the inner lens is retained by a holder positionally adjustable within the tube.

8. Apparatus according to claim 7 in which the optical system includes an optical stop defining a point within the said optical system conjugate to infinity.

9. Apparatus according to claim 4 in which the optical system includes an optical stop defining a point within the said optical system conjugate to infinity.

10. Apparatus according to claim 4 in which the outer lenses of the optical system are mounted within a tube, and the inner lens is retained by a holder positionally adjustable within the tube.

11. Apparatus according to claim 10 in which the optical system includes an optical stop defining a point within the said optical system conjugate to infinity.

12. Apparatus according to claim 2 in which the optical system cpmprises two optically thick lenses substantially in the form of cylinders, each cylinder having both bases formed spherically convex, the cylinders being adjacent to one another and sharing a common axis of symmetry.

13. Apparatus according to claim 1 in which the optical system produces negative unitary magnification and the fiducial element is a reference point.

14. Apparatus according to claim 13 in which the optical system comprises two outer optically thin converging lenses having a common focal point, and an inner diverging lens situated at the said focal point.

15. Apparatus according to claim 14 in which the two outer lenses are supported on mountings within a tube, and the inner lens is retained by a holder positionally adjustable within the tube.

16. Apparatus according to claim 13 in which the optical system comprises two optically thick lenses each being substantially in the form of a cylinder having one convex and one concave spherically ground base, the two cylinders sharing a common axis of symmetry with their concave bases adjacent one another.

17. Apparatus according to claim 13 in which the optical system includes two telephoto lens arrangements placed back to back to form an assembly comprising two outer optically thin converging lenses and at least two inner lenses.

18. Apparatus according to claim 17 in which the optical system includes an optical stop defining a point within the said optical system conjugate to infinity.

19. Apparatus according to claim 17 in which the outer lenses are supported on mountings within a tube and the inner lenses are retained by a holder positionally adjustable within the tube.

20. Apparatus according to claim 19 in which the optical system includes an optical stop defining a point within the said optical system conjugate to infinity.

21. Apparatus according to claim 17 in which the optical system comprises two outer converging optically thin lenses and two inner diverging optically thin lenses.

22. Apparatus according to claim 21 in which the optical system includes an optical stop defining a point within the said optical system conjugate to infinity.

23. Apparatus according to claim 22 in which the outer lenses are supported on mountings within a tube, and the inner lenses are retained by a holder positionally adjustable within the tube.

* * * * *